United States Patent [19]
Gipson

[11] Patent Number: 5,442,880
[45] Date of Patent: Aug. 22, 1995

[54] WINDOW ASSEMBLY WITH SLIDER

[75] Inventor: Ronnie G. Gipson, Dearborn, Mich.

[73] Assignee: Excel Industries, Inc., Elkhart, Ind.

[21] Appl. No.: 239,707

[22] Filed: May 9, 1994

[51] Int. Cl.⁶ .............................................. E05D 15/06
[52] U.S. Cl. ........................................ 49/413; 49/380; 49/449
[58] Field of Search .................. 49/380, 449, 413, 440

[56] References Cited

U.S. PATENT DOCUMENTS

| | | |
|---|---|---|
| 3,155,204 | 11/1964 | Campbell et al. . |
| 3,274,740 | 9/1966 | Hall . |
| 3,759,004 | 9/1973 | Kent . |
| 3,774,363 | 11/1973 | Kent . |
| 3,808,742 | 5/1974 | Ehret et al. ............................ 49/413 |
| 3,893,261 | 7/1975 | Cribben ................................. 49/449 |
| 3,967,424 | 7/1976 | Gates . |
| 4,072,340 | 2/1978 | Morgan . |
| 4,093,304 | 6/1978 | Ziegler . |
| 4,106,239 | 8/1978 | Bancroft et al. ....................... 49/449 |
| 4,124,054 | 11/1978 | Spretnjak ............................. 49/413 X |
| 4,139,234 | 2/1979 | Morgan . |
| 4,396,221 | 8/1983 | Morgan et al. . |
| 4,502,248 | 3/1985 | Thomas, Jr. et al. . |
| 4,635,398 | 1/1987 | Nakamura ............................. 49/413 |
| 4,700,525 | 10/1987 | Nieboer et al. . |
| 4,785,583 | 11/1988 | Kawagoe et al. ................... 49/413 X |
| 4,858,988 | 8/1989 | Morgan et al. . |
| 4,920,698 | 5/1990 | Friese et al. ......................... 49/380 |
| 4,995,195 | 2/1991 | Olberding et al. ................. 49/380 X |
| 5,054,242 | 10/1991 | Keys et al. . |
| 5,217,786 | 6/1993 | Keys . |
| 5,345,717 | 9/1994 | Mori et al. ......................... 49/380 X |

*Primary Examiner*—Philip C. Kannan
*Attorney, Agent, or Firm*—Banner & Allegretti, Ltd.

[57] ABSTRACT

A modular window assembly has a molded plastic frame defining one or more apertures, wherein at least one of the apertures can be opened and closed by a transparent pane which slides in opposed channels formed cooperatively by a backplate and the frame. The slide channels can be formed by backplate members attached to the frame at upper and lower rabbets. The frame can be a unitary one-piece frame having a latch keeper formed therein for releasably capturing a moveable member of a latch attached to the sliding pane. Tab and slot positioning means can be provided as unitary elements of the frame and a circumferentially extending halo molding fitted about the periphery of the window opening. Vehicle attachment studs optionally are attached to, e.g., sonically welded into, the frame and/or the backplate. In a motor vehicle application, the frame may further provide a unitary headliner flange extending inwardly to support a passenger compartment headliner. In accordance with a method of producing the window assembly, a first peripheral edge of the slider pane is inserted into one slide channel, after which a second slide channel is formed to capture an opposite peripheral edge of the slider pane. Fixed panes can be attached using curable adhesive together with faster acting hot melt adhesive which solidifies to a position-fixing bond upon assembly of the fixed pane to the frame.

18 Claims, 6 Drawing Sheets

WINDOW ASSEMBLY WITH SLIDER

INTRODUCTION

The present invention is directed to window assemblies with a sliding pane and to their manufacture. The assemblies are especially suitable for use in motor vehicles.

BACKGROUND OF THE INVENTION

Window assemblies which are pre-assembled prior to installation are widely used, particularly for motor vehicle applications. Pre-assembly of the glazing unit for simple insertion into a window opening in the vehicle body during vehicle assembly has been found to yield substantial cost and quality advantages. Such window assemblies typically include a metal or plastic frame holding one or more glass or plastic panes. The frame may be formed in place around the perimeter of the transparent panes, producing so-called encapsulated window assemblies. Encapsulation in this way is not always suitable, however, for window assemblies having a moveable pane. A sliding vent window is shown in U.S. Pat. No. 4,502,248 to Thomas Jr. et al, having a molded plastic guide bonded to one peripheral edge of the glass. The guide travels within a channel in a pillar supported by the vehicle body. This construction does not, however, permit a true pre-assembly of the glazing unit prior to installation in the motor vehicle window opening.

Window assemblies also are known having fixed or slidable panes attached to a pre-constructed base or frame. Considerable complexity generally is involved in design and assembly of such glazing units to obtain reliable component functioning (such as noise and weather sealing, smooth sliding, etc.), durability and accurate and consistent control of component positioning.

Improved window assemblies with slidable panes are needed particularly for motor vehicles, which can be pre-assembled prior to installation in the window opening. It is an object of the present invention to provide such window assemblies having a slidable pane, optionally being integrated with one or more fixed panes, which are readily pre-assembled and are suitable for meeting strict fit and finish requirements prevalent in motor vehicle and architectural glazing applications. These and other objects and advantages will be apparent from the following disclosure of the invention and description of various alternative embodiments.

SUMMARY OF THE INVENTION

In accordance with a first aspect, a window assembly has a molded plastic frame defining at least a primary aperture to be closed by a glass or other transparent slidable pane. Backplate means are attached to an exposed surface of the frame to form, in cooperation with the adjacent surface of the frame, slide channels extending along opposed sides of the aperture. For a glazing unit wherein the slidable pane is intended to slide back and forth laterally, the slide channels typically would be formed above and below the aperture. Peripheral edges of the slidable pane are disposed in the slide channels, such that the pane can slide back and forth between a closed position in which it sealingly closes the aperture and an open position in which at least a portion of the aperture is open. The frame can be injection molded or formed by other suitable means as a single unitary piece, with security and position locating features formed as unitary elements of its configuration. It is particularly advantageous that the backplate means may comprise simply a pair of elongate backplate members, each of which is attached to a segment or area of the frame having a rabbeted surface configuration, such that a substantially U-shaped slide channel is formed by the cooperation of the backplate member and the frame rabbet. As discussed below, formation of the slide channel in this way is particularly advantageous in facilitating assembly of the modular glazing unit.

In accordance with a second aspect, a method is provided for producing the aforesaid modular window assembly to be inserted as a preassembled unit into a window opening, such as in a motor vehicle body. The method comprises providing the one-piece frame defining at least a primary aperture with a pair of rabbets extending along opposed sides of the aperture. A first backplate member is attached to the frame at the first rabbet to form, in combination therewith, a first slide channel. A first peripheral edge of the sliding pane is inserted into the first channel, preferably with a low-friction runner interposed in the channel to receive and assist in positioning the pane. A second peripheral edge of the pane is then captured by forming a second slide channel over it by attaching a second backplate member to the frame at the second rabbet, again, optionally, with a low-friction runner in the channel.

It will be appreciated by those skilled in this area of technology, that the modular window assembly and the assembly method disclosed herein represent a significant technical advance. By using the one-piece frame as the assembly platform during construction of the modular unit, considerable reduction in design and assembly complexity can be achieved, with corresponding cost and reliability improvements. The one-piece frame provides not only the basic structural element of the window assembly, but preferably also various additional functional and design elements as discussed further below, including even styled or decorative surface areas exposed to view following installation of the window assembly into the window opening. These and additional feature and advantages will be readily apparent from the following detailed description of certain preferred embodiments.

BRIEF DESCRIPTION OF THE DRAWINGS

The following discussion of certain preferred embodiments of the invention refers to the appended drawings wherein:

FIGS. 3 through 9 are section views taken at various locations through the embodiment of FIG. 2, in some cases being enlarged for ease of illustration and understanding, wherein

Terms used in the following discussion to describe direction or orientation refer to the illustrated preferred embodiment, a motor vehicle backlite, in its installed position. Thus, the slider pane is described as being moveable laterally, meaning horizontally back-and-forth, right-to-left as viewed from the front or rear of the vehicle. The runners which are inserted into the upper and lower slide channels are described as aiding in trimming the fore-and-aft position of the slider pane, being a reference to a direction substantially parallel to the main front-to-back center line of the vehicle. By an "exposed surface" of the molded frame, to which the backplate means is attached, is meant simply an outer or free surface area of the frame.

The frame surface will not be exposed in the sense of being visible, of course, to the extent it is covered after the backplate is attached. An "exposed surface" does not include, however, a surface area within the interior of the body of the frame merely forming interfacial contact with an embedded member. Otherwise, the terms inward and inwardly generally mean into or toward the passenger compartment and, correspondingly, the terms exterior, outward and outwardly generally mean to or toward the outside of the passenger compartment. It should be understood, of course, that window assemblies of the invention are suitable for use in other configurations and in other locations, including, for example, with up-and-down slider panes, as sidelites for motor vehicles, as architectural windows, etc. In all such alternative embodiments, terms such as inward, outward, exterior and the like refer to the position or orientation which the window assembly has or will have when installed.

DETAILED DESCRIPTION OF CERTAIN PREFERRED EMBODIMENTS

Figure 1:
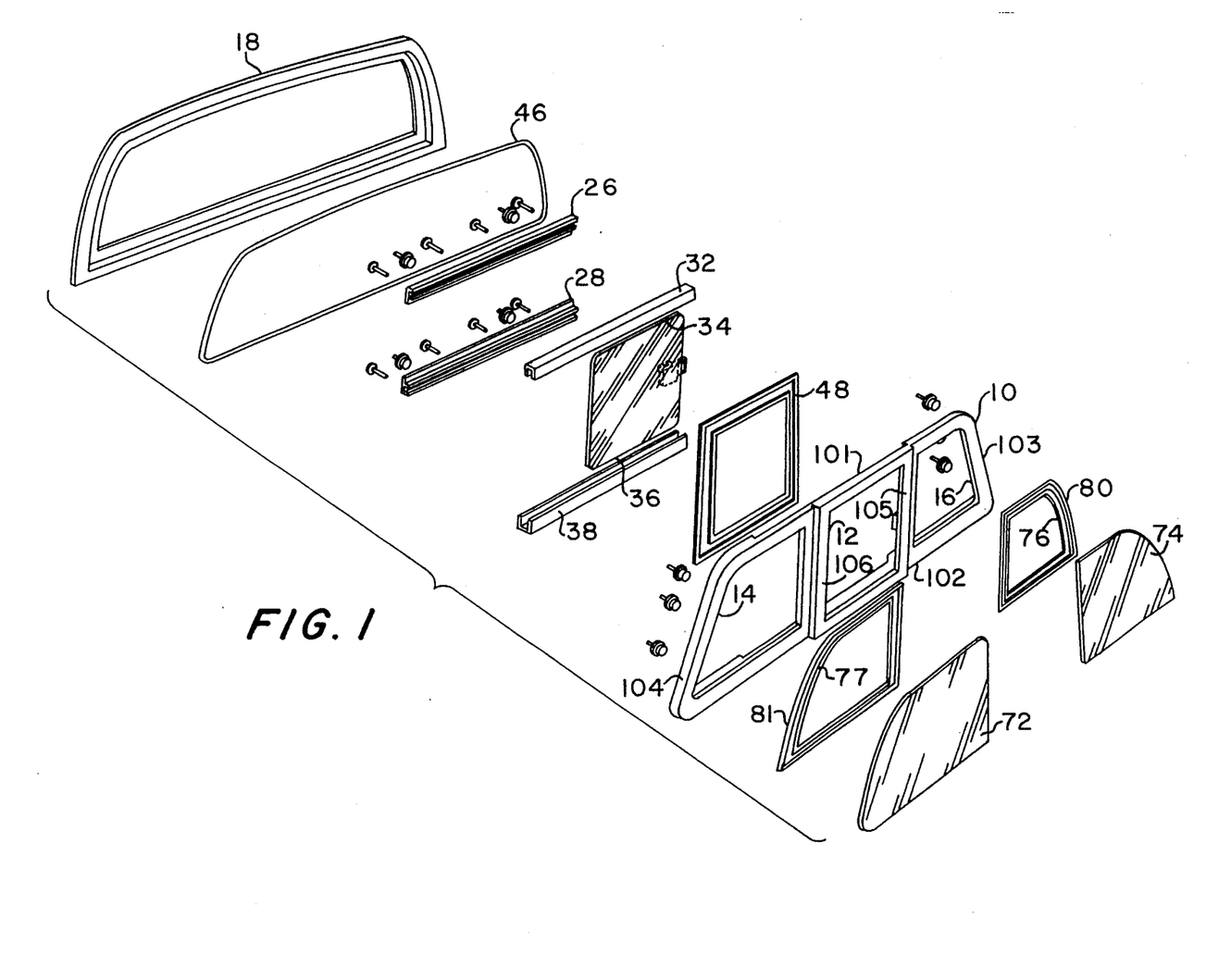
FIG. 1 is an exploded view of a window assembly, in particular a vehicle backlite having a slidable pane and fixed panes, in accordance with a preferred embodiment of the invention.
Figure 1A:
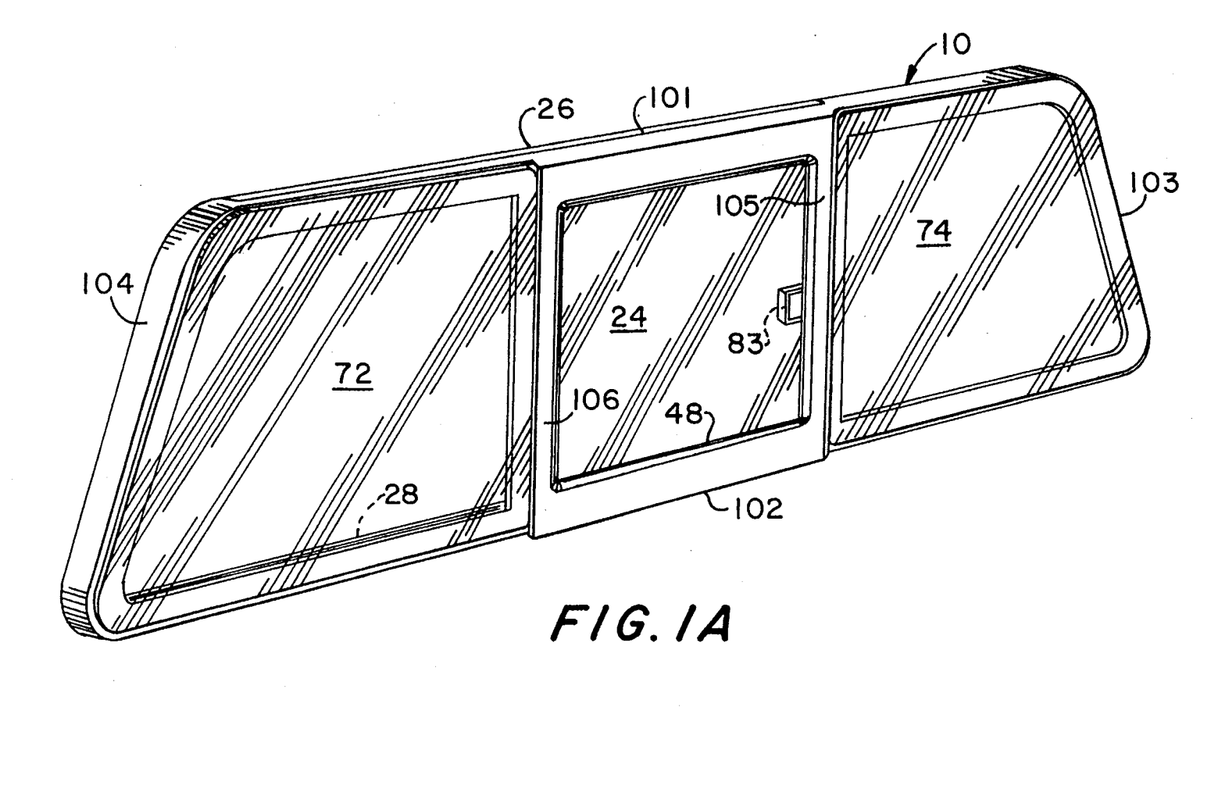
FIG. 1A is a perspective view of the window assembly of FIG. 1 in assembly with the halo molding.
Figure 2:
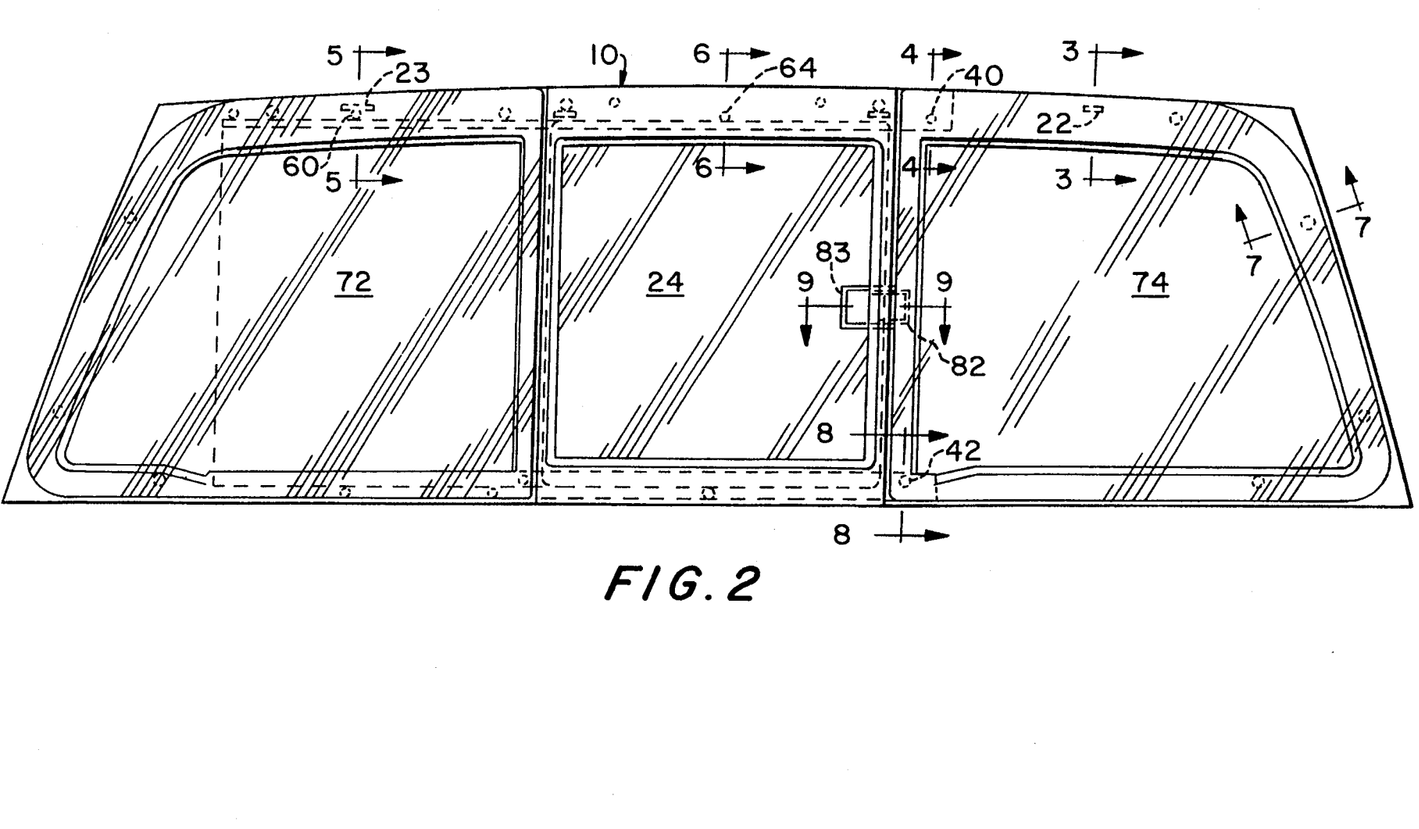
FIG. 2 is an elevation view of the window assembly of FIGS. 1 and 1A.

It will be understood by those who are skilled in this area of technology that the window assemblies disclosed and described herein are suitable for use in numerous applications, including motor vehicle and architectural applications. For purposes of illustration, various preferred and alternative features and aspects of the invention are now described in the context of a backlite for a motor vehicle, in particular a backlite for a pick-up truck. It should be understood, however, that the invention is not limited to this particular application, either in general or as to its particular features and elements. An exploded perspective view of the backlite is provided in FIG. 1, including a halo molding which typically would be affixed about the perimeter of the window opening prior to installation of the pre-assembled window unit. The backlite is shown in assembly with the halo molding in FIG. 1A and an elevation view (looking toward the vehicle from outside) is shown in FIG. 2.

The window assembly is seen to comprise a unitary molded plastic frame 10, most preferably being formed by injection molding a thermoplastic, for example GELOY thermoplastic available from General Electric Company. Reference herein to the frame of the window assembly in preferred embodiments as a one-piece or unitary frame is intended to mean that the frame is formed of a single, seamless body of material. Similarly, reference to features or elements, such as a latch-keeper, headliner flange, etc., as being "unitary" defines them as part of the single seamless body of material forming the frame, generally as recesses, protrusions, and like formations. In alternative embodiments such features may include integrated components, for example, a latch keeper strike plate may be provided by an insert molding technique during injection molding of the frame. It should be recognized, of course, that components will be attached to the frame during assembly of the window unit, including the backplate means which generally contribute structural strength and rigidity, and, optionally, mounting studs and the like.

The frame 10 defines a primary aperture 12 between left and right side apertures 14 and 16, respectively. The frame 10 is seen to comprise horizontally extending upper segment 101 and horizontally extending lower segment 102 which together with right-side segment 103 and left-side segment 104, both extending substantially vertically from the lower horizontal segment 102 to upper horizontal segment 101, form a circumferentially extending perimeter section of the frame. Post segments 105 and 106 which extend vertically from the lower segment 102 to the upper segment 101 are laterally spaced from each other and from the aforesaid side segments 103, 104. This configuration is seen to provide a primary center segment 12 flanked on the left by side aperture 14 and on the right by side aperture 16. Unitary frame 10 has sufficient rigidity and durability to act as a self-supporting platform or jig during assembly of additional components of the window unit. Numerous suitable materials for the frame are commercially available and will be readily apparent to those skilled in the art in view of the present disclosure. Similarly, alterations in the configurations in the window frame will be readily apparent, being primarily dictated by the intended application of the glazing unit.

Figure 3:
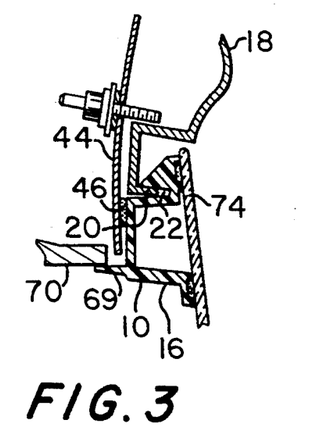
FIG. 3 is a view taken through line 3—3.
Figure 5:
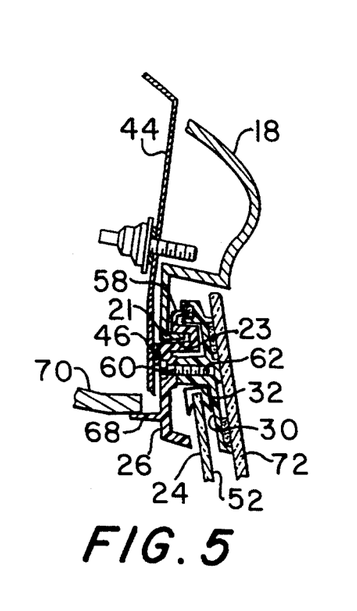
FIG. 5 is a view taken through line 5—5.
Figure 7:
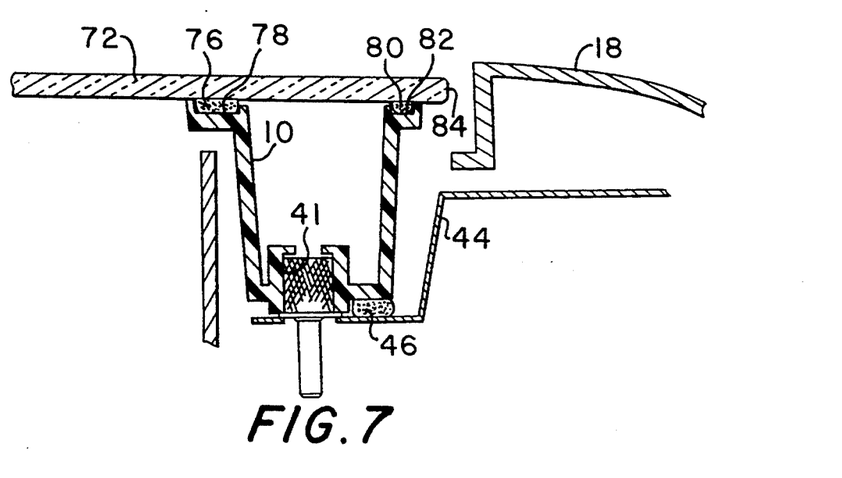
FIG. 7 is a view taken through line 7—7.

As best seen in FIG. 3, the unitary frame of the illustrated backlite comprises positioning means for precisely fixing the position of the window assembly to the halo molding 18. Specifically, frame 10 has locator slots which received corresponding locator tabs of the halo molding. Preferably, the locator slots are formed as a unitary concavity in the perimeter of the frame. The tabs preferably are formed as a unitary protrusion of the halo molding. Those skilled in the art will recognize that the tab and slot arrangement may be reversed, that is, the tab may be formed as a unitary protrusion of the frame and the slot be formed as a concavity in the halo molding. Alternative to the aforesaid unitary formation of the tabs and slots, corresponding components may be added as attachments to, or inserts into, the frame and halo molding. The dimensions of a first slot preferably are closely toleranced to the dimensions of the corresponding tab, both in the vertical and lateral directions, such that it acts to position the window assembly in the halo molding along both the X and Y axes. A second slot, laterally off-set from the first slot, preferably has dimensions closely toleranced for the corresponding tab in the vertical direction, while being somewhat oversized in its lateral dimension. The window assembly is thereby properly positioned both vertically and laterally by inserting the tabs into their corresponding slots during installation into the window opening. FIG. 3 illustrates a locator tab 20 as a unitary protrusion or extension of halo 18. Tab 20 is received into corresponding locator slot 22 formed as a unitary concavity in frame 10. A second locator tab 21 is seen in FIG. 5 to be received in a corresponding second locator slot 23 provided by upper backplate member 26. It should be recognized that FIG. 5 shows a cross-sectional view of the window assembly wherein slider pane 24 is in its open position and, accordingly, is seen to be in overlapping relationship with fixed pane 72 discussed further below. Unitary mounting stud recess 41 in one-piece frame 10 is seen in FIG. 7. In the finished assembly, in accordance with the preferred embodiment, a metal mounting stud would be sonically welded into recess 41 for attachment to the sheet metal at the periphery of the backlite opening in the motor vehicle body.

The center aperture 12 is closed by transparent sliding glass pane 24 which is mounted to the frame by backplate means comprising upper backplate member 26 and lower backplate member 28. The sliding pane may, of course, be formed alternatively of plastic or a laminate of glass and/or plastic. It will be understood by those who are skilled in this area of technology that the term "transparent," both as to the sliding pane and to any fixed panes incorporated into the glazing unit, is intended to have a broad meaning covering any light admitting window pane, including those which are clear, smoked, tinted, partially reflective, translucent, etc.

The backplate members are mounted to the inside surface of frame 10. Specifically, upper backplate member 26 extends horizontally along upper segment 101 of the frame above primary aperture 12, while lower backplate member 28 extends parallel to the upper backplate member along lower segment 102 of the frame below primary aperture 12. Most preferably the frame provides a rabbeted surface underlying the backplate members which may likewise have a correspondingly rabbeted surface. As best seen in FIGS. 1 and 4 through 6, upper backplate member 26 cooperates with the underlying rabbeted surface of upper segment 101 to form an upper slide channel 30. Upper slide channel 30 is an essentially downwardly open U-shaped channel. It should be understood that the term "U-shaped" is used herein broadly to mean any concave cross-section. The base between the two legs of the U-shape may be flat, rounded, raised to form a pedestal (thereby forming a W-shape) etc. Preferably the configuration of the actual track embracing the peripheral edge of the sliding pane in the slide channel is formed at least in part by a low-friction runner inserted into the channel mediate the glass and the frame and backplate member. More specifically, such runner preferably engages the peripheral edge of the sliding pane in the slide channel. Thus, in the illustrated embodiment, upper runner 32 is seen to form a U-shaped track receiving the upper peripheral edge 34 of glass pane 24. Correspondingly, lower peripheral edge 36 of glass pane 24 is disposed in lower runner 38 which is inserted into the lower slide channel formed by lower backplate member 28 in cooperation with the rabbeted surface of lower horizontal segment 102 of the frame 10 below aperture 12. The upper and lower runners preferably are formed of molded plastic, most preferably extruded polypropylene and the like. Alternative materials will be readily apparent to those skilled in the art in view of the present disclosure.

Reference to the frame as having a rabbeted surface is intended to mean that it has at least one rabbet in its surface, that is, a rebate or depression formed preferably as a unitary element of the configuration of the frame. Preferably the frame has two separate rabbets, one being on either side of the aperture, for example, one above and one below the aperture as in the illustrated embodiment, to cooperate with the backplate members to form the two opposed slide channels. The rabbets will extend, typically, beyond the primary aperture. Thus, lower backplate member 28 in the illustrated embodiment forms an upwardly open U-shaped slide channel in cooperation with a horizontal rabbet in the surface of frame 10 extending beneath center aperture 12 and partially beneath left-hand aperture 14. The upper rabbet and upper backplate member correspondingly form a downwardly open U-shaped slide channel extending beyond center aperture 12 over left-hand aperture 14.

Figure 4:
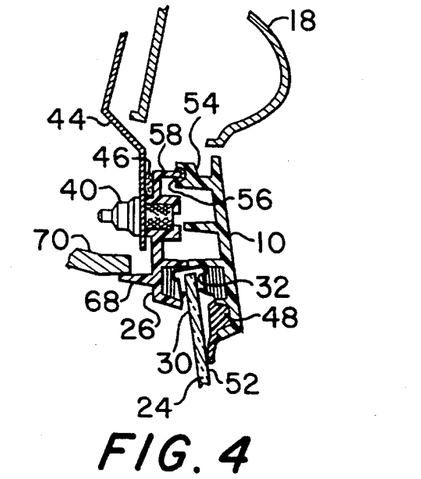
FIG. 4 is a view taken through line 4—4.
Figure 8:
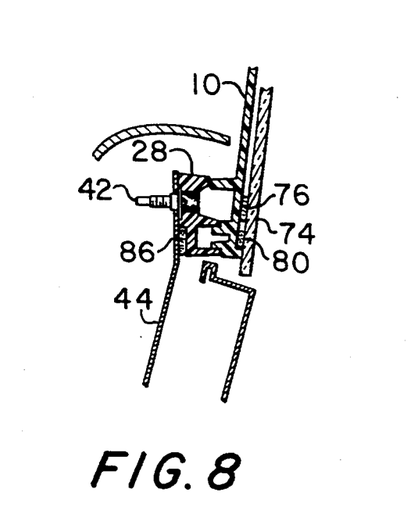
FIG. 8 is a view taken through line 8—8.
Figure 9:
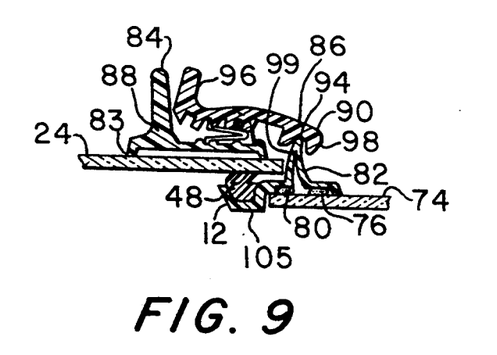
FIG. 9 is a view taken through line 9—9.

As mentioned above, the one-piece frame preferably is sufficiently rigid and durable to be substantially self-supporting during the assembly of the window unit. In that regard, the backplate members preferably also are sufficiently robust to contribute substantially to the rigidity and strength of the assembly. Most preferably, the backplate members are formed of glass fiber-reinforced nylon, although numerous suitable alternative materials will be readily apparent to those skilled in the art in view of the present invention. The backplate members are preferably also sufficiently rigid and strong to support mounting means for attachment of the glazing unit to the vehicle body. Most preferably inwardly extending mounted studs are provided about the perimeter of the glazing unit, including mounting studs extending inwardly from the frame and additional mounting studs extending inwardly from the upper and lower backplate members. In that regard, the frame 10 preferably has unitary mounting stud recesses formed therein, for example, 5 to 10 such recesses, into which metal mounting studs with knurled shoulders are inserted and sonically welded. Two or three additional studs are provided in each of the backplate members, for example, by sonic welding, insert molding or other suitable method. In FIG. 4, upper backplate member 26 is seen to incorporate sonically welded mounting stud 40. Similarly, in FIG. 8, lower backplate member 28 is seen to incorporate screw-in mounting stud 42. In the illustrated embodiment of a backlite for a motor vehicle, the mounting studs most preferably engage the sheet metal of the vehicle body. Typically, a circumferentially extending bead of curable adhesive 46 will be provided mediate the one-piece frame 10 and the sheet metal 44 to ensure a good noise and weather seal between the vehicle body and the window assembly. Alternative sealing means, such as an air core resilient tube and the like will be apparent to those skilled in the art in view of the present disclosure.

Figure 6:
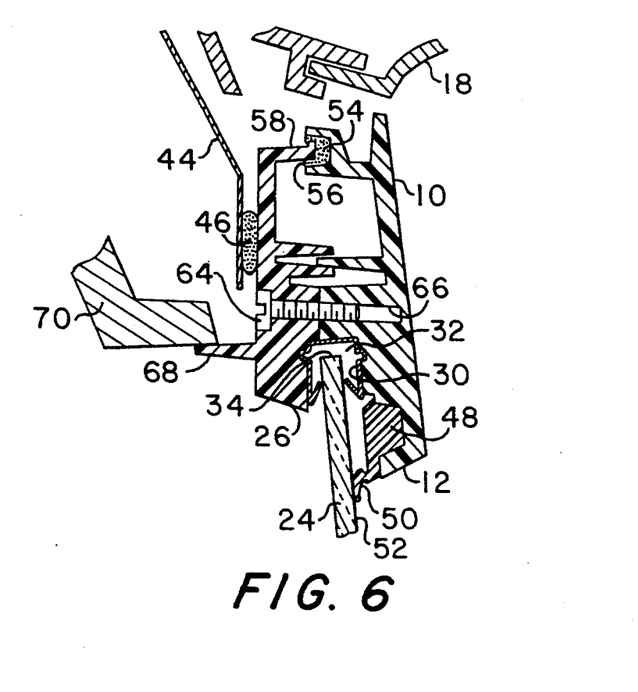
FIG. 6 is a view taken through line 6—6.

The backplate members are affixed to the frame by multiple attachment screws or the like, preferably with one or more beads of resilient sealant material between them. In the illustrated embodiment, as best seen in FIG. 6, a bead of sealant 54 is provided in a U-shaped channel 56 which receives an upper backplate member flange 58. Corresponding structure is provided for sealing lower backplate member 28 to the frame 10.

The attachment of upper backplate number 26 to the one-piece frame 10 is by attachment screws, as seen in FIGS. 5 and 6. In FIG. 5, attachment screw 60 is seen to extend outwardly through upper backplate number 26 into a screw-receiving recess 62 in frame 10. Similarly, in FIG. 6, attachment screw 64 is seen to extend outwardly through backplate member 26 into screw receiving recess 66 in frame 10. Similar attachment screws are provided for attaching the lower backplate member 28 to the frame.

To ensure a good noise and weather seal of the center aperture 12 when slider pane 24 is in its closed position, a seal preferably is provided about the perimeter of the opening. In the illustrated embodiment a resilient seal 48 is provided, preferably comprising EPDM, on the inside surface of frame 10 extending circumferentially about center aperture 12. As best seen in FIGS. 4 and 6, the EPDM seal 48 is positioned below upper slide channel 30 and is correspondingly above the lower slide channel. As best seen in FIG. 6, seal 48 has a flange 50 which is resiliently biased into contact with the exterior surface 52 of sliding pane 24.

The illustrated embodiment further comprises an optional, but highly advantageous feature, specifically, a headliner support flange. More specifically, as best seen in FIGS. 3–6, headliner support flange 68 extends inwardly from upper backplate member 26 into the passenger compartment of the vehicle. Support flange 68 extends horizontally along substantially the entire lateral width of the upper backplate member 26. As seen in FIG. 3, support flange 68 is continued as support flange 69 beyond the end of the upper backplate member. Support flange 69 extends inwardly from the inside surface of frame 10. The headliner support flange 68/69 supports a rear peripheral edge of headliner 70. In this way, the glazing unit integrates a support member for a passenger compartment headliner, providing both functional and aesthetic advantages.

As noted above, the window assembly of the invention may comprise one or more window apertures additional to the primary aperture discussed above to be closed by sliding pane 24. Such additional apertures may be closed by fixed panes or by panes for which sliding arrangement is provided, preferably in accordance with the features of the present invention. In the illustrated embodiment, two additional window apertures 14, 16 are provided on either side of aperture 12. Aperture 14 on the left (i.e., driver) side is closed by fixed glass pane 72, while aperture 16 on the right side of primary aperture 12 (as viewed from the rear of the vehicle) is closed by fixed glass pane 74. The fixed panes 72, 74 can be attached to either the inside or outside surface of frame 10. In accordance with a novel and aethetically advantageous feature of the illustrated embodiment, the exterior surface of frame 10 is recessed to receive fixed panes 72, 74 substantially flush with the exterior surface of frame 10 about the periphery of center aperture 12. Thus, an overall flush appearance is obtained for the window unit as viewed from outside the vehicle.

Various suitable means will be apparent to those skilled in the art for attachment of the fixed panes 72, 74 to frame 10. In accordance with a highly advantageous aspect of the present invention, the fixed panes preferably are attached to frame 10 using dual adhesives, together with primers and like surface preparation materials and techniques well-known to those skilled in this area. Referring particularly to FIGS. 3 and 7, a first bead of adhesive 76 is deposited on mounting surface 78 of frame 10. This first adhesive preferably comprises a highly durable and resilient adhesive such as urethane adhesive or the like. Typically, such adhesives cure over a period of time during which transport and handling of the glazing unit could cause the fixed glass pane to become dislodged or mispositioned. Accordingly, a second bead of hot melt adhesive 80 is provided, preferably on a second mounting surface 82 of frame 10, either as a continuous head or, optionally, intermittently. The hot-melt adhesive, for example, a polyamid hot-melt adhesive, is deposited at a temperature and in an amount such that it is substantially hardenable into a durable bond upon assembly of the fixed pane to the one-piece frame. The bond between the hot-melt adhesive and the fixed pane need merely be sufficiently durable to withstand transport and handling of the window assembly prior to curing of the more durable urethane adhesive bond. Assembly time for the glazing unit is substantially reduced in this way, since the glazing unit can be handled and transported without waiting for the urethane adhesive to cure, typically one to two hours. As seen in FIG. 1, corresponding adhesive beads are provided for attachment of left-hand pane 72 to the frame. Specifically, bead 81 of hot melt adhesive extends circumferentially about the periphery of fixed pane 72 and urethane adhesive bead 77 extends substantially parallel the hot-melt adhesive bead. Those skilled in the art will recognize that the above-described tab and slot positioning means, taken in conjunction with the dual adhesive attachment method just described can aid in insuring compliance with strict fit-and-finish requirements including, for example, the gap (best seen in FIG. 7) between the halo molding 18 and the outer peripheral edge 84 of the fixed glass pane 74.

In accordance with another significant aspect of the preferred embodiments illustrated in the drawings, one-piece frame 10 provides a unitary latch keeper 82 formed in vertical post segment 105 of the frame. Latch keeper 82 is seen to consist of an inwardly extending lip or flange for releasably holding a moveable member of a latch attached to slidable pane 24 to secure the slidable pane in its closed position. More specifically, latch 84 is seen to be affixed to the inside surface 83 of slidable pane 24. It comprises a latch lever 86 which is pivotably attached to a latch base 88. Free end 90 of latch lever 86 forms a recess 94 which is biased into locking engagement with latch keeper 82. Pressure on opposite end 96 of latch lever 86 disengages recess 94 from latch keeper 82, allowing the slidable window 24 to be opened. It can be seen that the beveled surface 98 of free-end 90 of latch lever 86 will cooperate with the correspondingly beveled surface 99 of latch keeper 94 to automatically lift the latch lever into locking position upon moving sliding glass 24 to its closed position.

From the foregoing discussion, those skilled in the art will recognize the advantages afforded by the assembly method aspect of the invention. Starting by providing the one-piece frame, such as by injection molding or the like, which defines at least a primary aperture, a first backplate member is attached to the frame to form a first slide channel extending along the perimeter of the aperture. A first peripheral edge of a glass or other transparent pane is inserted into the slide channel. A second peripheral edge of the pane is then captured in a second channel formed by attaching a second backplate member to the frame. The backplate members and the underlying surface of the frame, preferably being rabbeted, cooperate to form the slide channels. In preferred embodiments runners are disposed within the slide channels to provide a low-friction track for the sliding pane and/or to trim the fore-and-aft position of the pane within the window assembly. Also, a resilient seal preferably is positioned on the frame around the perimeter of the aperture prior to assembling the backplate members and sliding pane. The method aspect of the invention preferably further comprises attaching fixed panes of the assembly, if any, using the above-described dual adhesive technique. In addition, mounting studs for mounting the window assembly to the vehicle body (or architectural framework in embodiments intended for architectural applications) are attached, preferably by sonic welding in accordance with a novel aspect of the invention.

Those who are skilled in this area of technology will recognize from the foregoing disclosure of the invention and description of preferred embodiments that various modifications and alternative embodiments are possible within the true scope and spirit of the invention. The appended claims are intended to cover all such modifications and alternative embodiments.

I claim:

1. A window assembly comprising, in combination:
a molded plastic frame defining at least a primary aperture;
backplate means attached to an exposed surface of the frame forming, in cooperation with the frame, elongate slide channels extending substantially parallel each other on opposed sides of the primary aperture; and
a transparent slidable pane having peripheral edges in the slide channels and being slidable back and forth between a closed position in which it sealingly closes the primary aperture and an open position in which at least a portion of the primary aperture is open.

2. The window assembly of claim 1 further comprising a latch attached to the slidable pane, wherein the molded plastic frame has a unitary latch keeper formed therein for receiving a moveable member of the latch to secure the transparent pane in its closed position.

3. The window assembly of claim 1 wherein the one-piece frame defines at least one additional aperture and the window assembly further comprises a fixed pane attached to the molded plastic frame in a fixed position closing the additional aperture.

4. The window assembly of claim 1 further comprising a runner in each of the slide channels, receiving a corresponding peripheral edge of the slidable pane.

5. The window assembly of claim 4 wherein the molded plastic frame is injection molded thermoplastic, the backplate means comprises elongate backplate members formed of fiber reinforced nylon, each runner is formed of polypropylene and the slidable pane is glass.

6. A motor vehicle window assembly for installation as a pre-assembled unit to close an opening in a motor vehicle body, the opening having a halo molding about its periphery, the window assembly comprising, in combination:
a molded plastic one-piece frame defining at least a primary aperture, having a rabbeted surface and positioning means for correctly positioning the window assembly in the motor vehicle body opening, comprising multiple surface elements selected from tabs and slots for mating with close dimensional tolerance with corresponding elements provided by the halo molding;
backplate means attached to the one-piece frame for forming, in cooperation with the rabbeted surface of the frame, upper and lower slide channels extending horizontally above and below the primary aperture, respectively; and
a transparent slidable pane having an upper peripheral edge in the upper slide channel and the lower peripheral edge in the lower slide channel, being laterally slidable back and forth between a closed position in which it sealingly closes the primary aperture and an open position in which at least a portion of the primary aperture is open.

7. The motor vehicle window assembly of claim 6 further comprising a latch attached to the slidable pane, wherein the molded plastic frame has a unitary latch keeper formed therein for receiving a moveable member of the latch to secure the slidable pane in the closed position.

8. The motor vehicle window assembly of claim 6 wherein the one-piece frame defines at least one additional aperture and the window assembly further comprises for each additional aperture a fixed pane attached to the molded plastic frame in a fixed position closing the additional aperture.

9. The motor vehicle window assembly of claim 6 further comprising:
in the upper channel, an upper runner forming an elongate substantially U-shaped track receiving the upper peripheral edge of the slidable pane and fixing its fore-and-aft position in the upper channel; and
in the lower channel, a lower runner forming an elongate substantially U-shaped lower track receiving the lower peripheral edge of the slidable pane and fixing its fore-and-aft position in the lower channel.

10. The motor vehicle assembly of claim 6 wherein the positioning means comprises a first slot in a substantially vertically extending first segment of the one-piece frame, said first slot being closely toleranced both horizontally and vertically for receiving a corresponding first tab extending outwardly from the halo molding, and a second slot in a substantially vertically extending second segment of the one-piece frame laterally spaced from the first segment, the second slot being closely toleranced vertically and oversized in its horizontal dimension for receiving a corresponding second tab extending outwardly from the halo molding.

11. The motor vehicle window assembly of claim 6 wherein the one-piece frame comprises:
a peripheral section having horizontally extending upper and lower segments and side segments extending vertically from the lower segment to the upper segment, and
laterally spaced first and second post segments each extending vertically from the lower segment to the upper segment between the side segments, defining right and left apertures adjacent to and on opposite sides of the primary aperture, the window assembly further comprising a first side pane attached to the one-piece frame in fixed position over the right aperture and a second side pane attached to the one-piece frame in fixed position over the left aperture.

12. The motor vehicle window assembly of claim 11 wherein the one-piece frame further comprises a headliner flange unitary therewith, extending inwardly along the upper segment of the one-piece frame as a support for a passenger compartment headliner.

13. A pre-assembled modular backlite for a pickup truck having a halo molding fitted peripherally in its backlite body opening, the backlite comprising, in combination:
a molded plastic one-piece frame having an exterior side to face outside the truck and an interior side to face into a passenger compartment of the truck, comprising:
substantially horizontally extending upper and lower segments and right and left side segments each extending substantially vertically from the lower segment to the upper segment to form in combination therewith a circumferentially extending peripheral section of the one-piece frame, and first and second post segments extending substantially vertically from the lower segment to the upper segment, being laterally spaced from the side segments and from each other, thereby defining a center aperture between a right aperture and a left aperture;

a first side pane sealingly attached in fixed position to the exterior side of the one-piece frame to close the right aperture;

a second side panel sealingly attached in fixed position to the exterior side of the one-piece frame to close the left aperture;

an elongate, upper backplate member attached to the upper segment on the interior side of the one-piece frame and forming, in cooperation with a horizontally extending rabbet in the upper segment, an upper channel extending laterally above the center aperture;

an elongate lower backplate member attached to the lower segment on the interior side of the one-piece frame and forming, in cooperation with a horizontally extending rabbet in the lower segment, a lower channel extending laterally below the center aperture;

an upper runner in the upper channel forming a substantially U-shaped, horizontally extending, low-friction upper slide track;

a lower runner in the lower channel forming a substantially U-shaped, horizontally extending, low-friction lower slide track; and a transparent third pane adjacent to the inside surface of the one-piece frame, having a substantially horizontal upper peripheral edge in the upper slide track and a substantially horizontal lower peripheral edge in the lower slide track; being slidable laterally back and forth between an open position and a closed position to open and close the center aperture, respectively.

14. The pre-assembled modular backlite for a pickup truck in accordance with claim 13 wherein the one-piece frame further comprises a horizontal headliner flange unitary therewith, extending inwardly from the upper segment into the passenger compartment to support a headliner.

15. The pre-assembled modular backlite for a pickup truck in accordance with claim 14 wherein the exterior side of the one-piece frame about the center aperture is substantially flush with the first and second glass panes.

16. The pre-assembled modular backlite for a pickup truck in accordance with claim 15 wherein the upper and lower backplate members comprise inwardly extending mounting studs for mounting the backlite in the backlite body opening.

17. The pre-assembled modular backlite for a pickup truck in accordance with claim 16 further comprising a seal attached to the interior side of the one-piece frame, extending circumferentially around the center aperture and having sealing contact with an outwardly facing surface of the third pane in its closed position.

18. The pre-assembled modular backlite for a pick-up truck in accordance with claim 17 further comprising:

a latch attached to the third pane, the one-piece frame having a unitary latch keeper formed in one of the post segments for releasably capturing a moveable member of the latch to secure the third pane in its closed position; and positioning means for positioning the back lite in the backlite body opening, comprising a first slot formed in one of the side segments of the one-piece frame to receive a corresponding tab extending outwardly from the halo molding for vertical and lateral positioning, and a second slot formed in a second one of the side segments to receive a second tab extending outwardly from the halo molding for vertical positioning.

* * * * *

UNITED STATES PATENT AND TRADEMARK OFFICE
CERTIFICATE OF CORRECTION

PATENT NO. : 5,442,880
APPLICATION NO. : 08/239707
DATED : August 22, 1995
INVENTOR(S) : Gipson et al.

Page 1 of 1

It is certified that error appears in the above-identified patent and that said Letters Patent is hereby corrected as shown below:

On the Title Page

Item (12) "Gipson" should read -- Gipson, et al. --.

Item (75) Inventor is corrected to read:
-- Ronnie G. Gipson, Dearborn (MI);
James C. Capiak, Three Oaks (MI) --.

Signed and Sealed this
Twentieth Day of August, 2019

Andrei Iancu
*Director of the United States Patent and Trademark Office*